March 11, 1924.

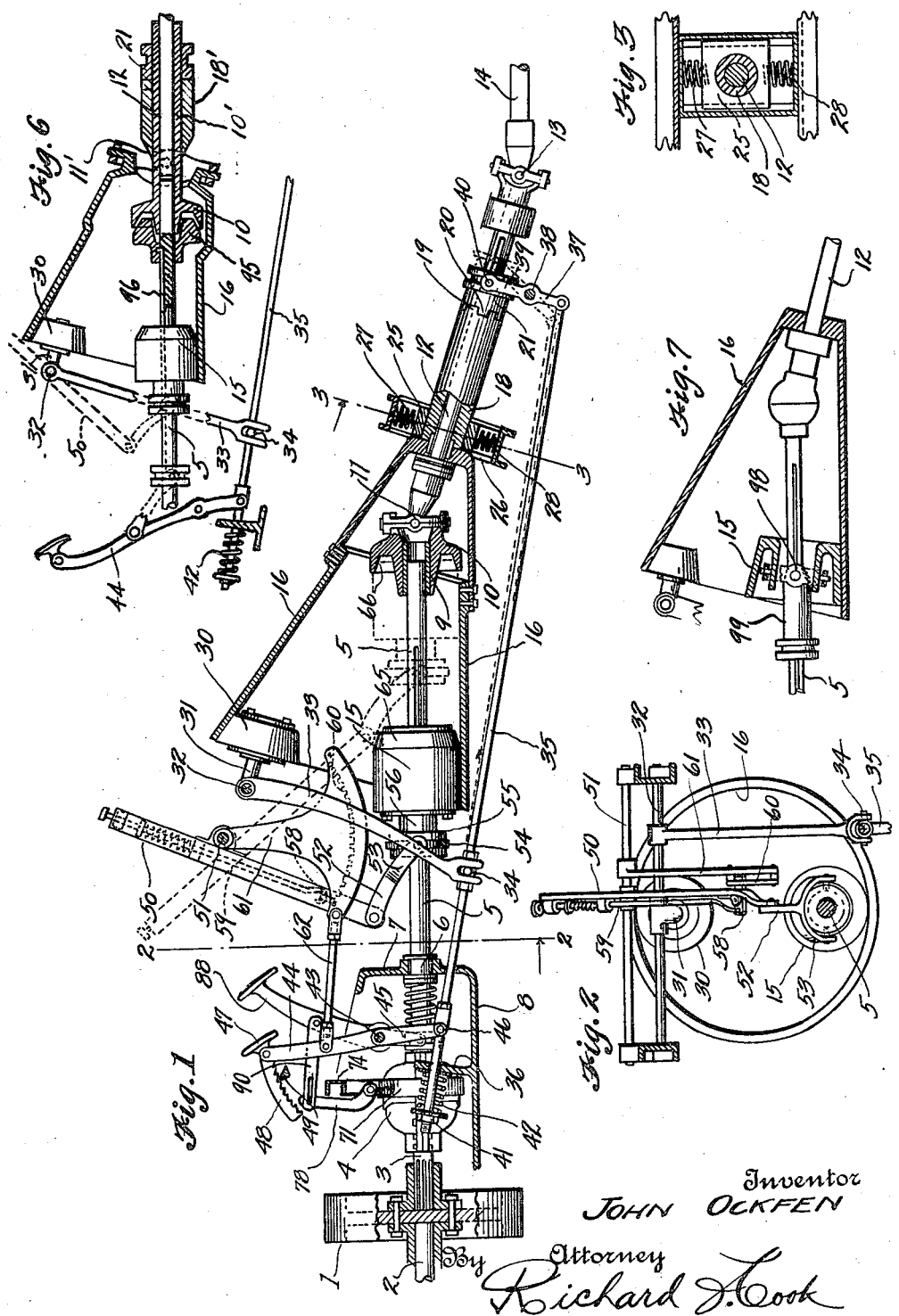

J. OCKFEN 1,486,389

VARIABLE SPEED DRIVING MECHANISM

Filed Oct. 30, 1922   2 Sheets-Sheet 2

Inventor
JOHN OCKFEN
By Richard J. Cook
Attorney

Patented Mar. 11, 1924.

1,486,389

UNITED STATES PATENT OFFICE.

JOHN OCKFEN, OF SPANWAY, WASHINGTON.

VARIABLE-SPEED DRIVING MECHANISM.

Application filed October 30, 1922. Serial No. 597,823.

*To all whom it may concern:*

Be it known that I, JOHN OCKFEN, a citizen of the United States, and a resident of Spanway, county of Pierce, and State of Washington, have invented certain new and useful Improvements in Variable-Speed Driving Mechanism, of which the following is a specification.

This invention relates to improvements in a variable speed driving mechanism, more particularly to mechanism of that character for use in connection with the driving mechanism of automobiles, trucks, or other motor driven vehicles; the principal object of the invention being to provide means whereby an infinite number of different speeds between a maximum and minimum may be attained.

A further object of the invention resides in the provision of a driving mechanism of the above character, embodying in connection with a shaft that may be driven at a more or less constant speed, a friction wheel that is keyed to the said shaft for longitudinal shifting thereon, and which is adapted to frictionally contact with the inner surface of a conically shaped bell that is fixed, at its apex, to a power transmission shaft and which may be caused to rotate faster or slower accordingly as the friction wheel is shifted farther toward or from the apex of the bell.

Another object of the invention resides in the provision of means whereby direct driving connection between the driven shaft and the driving shaft may be effected, and whereby at such times, the mechanism for frictional driving is rendered inoperative.

Another object of the invention is to provide a novel mechanism whereby the direction of the driving shaft may be reversed.

Other objects of the invention reside in the details of construction of the various parts embodied in the mechanism, and in the combination whereby efficient, durable, safe and satisfactory mechanism is provided.

In accomplishing these and other objects of the invention, I have provided the improved details of construction the preferred forms of which are illustrated in the accompanying drawings, wherein—

Figure 1 is a longitudinal, sectional view of a variable speed driving mechanism constructed in accordance with the present invention.

Figure 2 is a transverse section taken substantially on the line 2—2 in Figure 1.

Figure 3 is a transverse section taken on the line 3—3 in Figure 1 illustrating the yieldable mounting of the driven shaft.

Figure 6 is a detail, sectional view, illustrating an alternative construction of driving bell.

Figure 7 is another alternative construction.

Figure 5:
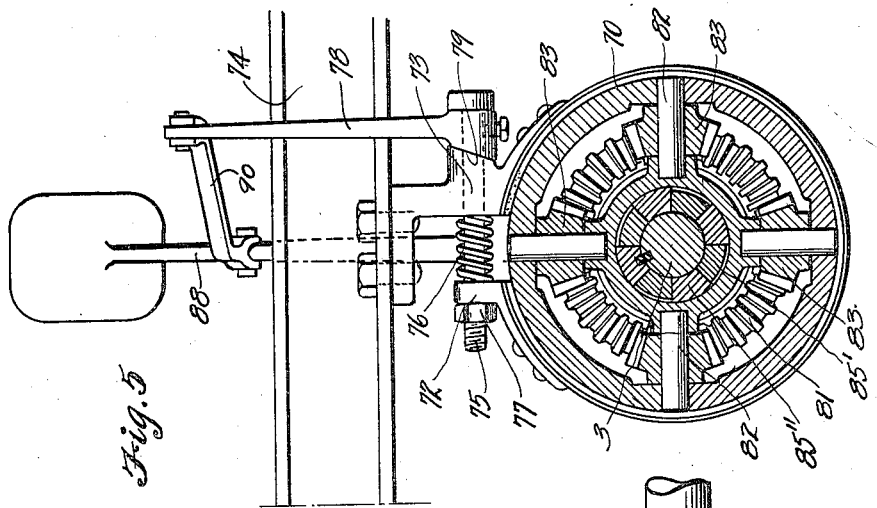
Figure 5 is a transverse, sectional view, taken on the line 5—5 in Figure 4.

Referring more in detail to the drawings—

1 designates what may be the fly wheel of the engine, whereby the vehicle wherein the present mechanism is employed, is driven; this wheel being fixed on the engine crank shaft, designated at 2. Operatively fixed to the wheel is one end of a short shaft 3 which enters a gear housing 4 wherein it has operative driving connection by means of gears presently described, with a shaft 5 which continues therefrom. This latter shaft is rotatably supported adjacent the housing 4 in a bearing 6 that is mounted in the rear wall 7 of a casing 8 and, at its rearward end, is freely rotatable within the hub portion 9 of a clutch head 10 which, by means of a universal connection as indicated at 11, is operatively fixed to one end of a shaft 12 which extends downwardly at an incline and, at its lower end, is joined, by a universal connection as at 13, with a shaft 14 which may connect with the vehicle wheels, not shown, through the usual differential mechanism. For better explanation, the shaft 5 will hereinafter be referred to as the driving shaft; the shaft 12 as the driven shaft; and the shaft 14 as the power transmission shaft.

The construction so far described provides that the shaft 3 will be driven by its connection with the fly wheel 1, and that the shaft 5 will be driven from the shaft 3 through the gearing connection within the housing 4, later described.

In order that there will be provided a variable speed driving connection between the driving shaft 5 and the driven shaft 12, I have provided a friction driving wheel, or roller, 15 that is longitudinally shiftable along the shaft 5 and is keyed thereto. This wheel frictionally engages with the inner surface of a metallic, conically shaped bell 16 that is mounted to enclose the rearward end portion of the shaft 5, the clutch 10 and the universal connection 11, and which is fixed, at its apex to one end of a sleeve 18 that is revolubly fitted about the shaft 12. The lower end of the sleeve 18 is equipped with clutch teeth 19 adapted to mesh with clutch teeth 20 of a collar 21 that is slidably keyed to the shaft 12 and which may be moved into and from locked relation with the sleeve. The bell 16 is so mounted that its axial line coincides with the axial line of the shaft 12 and its lower surface lies parallel with the shaft 5 and thereby provides that frictional contact will be maintained therewith, by the wheel 15, at any position the latter may be shifted to within the bell.

The upper end of the sleeve 18, adjacent the bell, is supported within a bearing block 25 which is slidable in a vertical direction within a guide housing 26 between springs 27 and 28 at the upper and lower sides thereof. This yieldable support provides that unless a surface of the cone be pressed tightly against the friction driving wheel 15, there will not be sufficient frictional contact between the two that driving will be effected. The means whereby the cone may be brought firmly against the friction wheel and held in this position to effect a desired driving connection, is best illustrated in Figure 1. This means comprises a conically shaped wheel 30 that is mounted at one end of a shaft, or arm, 31 that is supported from a rock shaft 32 that is mounted in the vehicle frame transversely across the upper portion of the cone at its open end.

To the shaft 32, is also fixed a lever 33 that extends downwardly therefrom and, at its lower end, has pivotal connection, as at 34, with a shifting rod 35 which, in turn, at its forward end, is slidable through a guide plate 36 in the housing 8 and, at its rearward end, is fixed to the outer end of a shifting lever 37 whereby the clutch collar 21 on the shaft 12 may be moved into and from locking relation with the end of the sleeve 18.

The clutch collar in this construction, has an annular groove therein and the lever 37, which is pivotally supported by means of a pin, or bolt, as at 38, has yoke arms 39 extending on opposite sides of the collar and these are provided with inwardly extending pins 40 at their ends which project within the groove, so that shifting of the lever by means of the rod 35 will cause the shifting of the collar along the shaft 12.

At the forward end of the rod 35, a nut 41 is threaded thereon and between this nut and the plate 36, a compression spring 42 is mounted which tends to move the rod forwardly and, in doing so, will release the clutch 21 from the sleeve 18 and also remove the pressure of the wheel 30 from the bell.

Mounted transversely of the housing 8, above the shaft 5, is a rock shaft 43 and, fixed thereto, is an upwardly extending foot lever 44 and a downwardly extending lever 45 which has pivotal connection, at its lower end as at 46, with the rod 35. At the upper end of the foot lever 44 is a pedal 47 having a ratchet arm 48 extended therefrom, the teeth of which are adapted to engage a fixed tooth 49 to retain the shifting rod 35 at set positions against the pressure of the spring 42. With this construction, when it is desired to effect a driving connection between the friction wheel 15 and the bell, the foot pedal is pushed forwardly and this effects a rearward movement of the rod 35 which causes the clutch 21 to engage the sleeve 18 and the wheel 30 to be pressed against the upper portion of the bell, so that the latter will be held tightly against the friction wheel 15 and driving connection thereby provided.

The means provided for shifting the friction wheel 15 along the shaft 5 to effect the different driving speeds for the shaft 12, consists of a lever 50 that is pivotally supported from a transverse shaft 51 supported from the vehicle frame. At its lower end, this lever is connected with the forward end of a link 52 which, at its rearward end, has a yoke 53, the arms of which are pivotally connected with the opposite side of a ring 54 that is revolubly fitted within an annular groove 55 that is formed within an extended hub portion 56 of the wheel 15. By forward or rearward shifting of the upper end of the lever 50, there will be effected an inward or outward shifting of the wheel 15 within the bell and this, when held in driving contact with the bell, will effect the different driving speeds; it being apparent that the farther toward the apex of the bell that the wheel is shifted, the faster will be the driving of the shaft 12.

In order that the driving wheel 15 may be retained at the different positions of adjustment, I have provided the lever 50 with a pivotally mounted locking dog 58 which is actuated by means of a spring pressed rod 59, mounted on the lever into contact with a notched sector 60 fixed to a plate 61 that is pivotally mounted on the cross shaft 51. One end of this sector 60 is joined, by means of a connecting link 62, with the foot lever 44, so that it moves therewith, but since the pedal is normally locked against movement, the sector is likewise normally stationary and, when the lever 50 is locked thereto, the driving wheel 15 will be retained at set position.

In order that a direct driving connection between the shafts 5 and 9 may be effected, I have provided a conically tapered surface 65 on the inner end of the friction wheel 15, and this is adapted to be moved into frictional driving contact with a co-operating conically formed surface 66 on the clutch head 10. This connection is made by throwing the upper end of the lever 50 to its forward limit, as shown in dotted lines in Figure 1, so that the locking dog of the lever will be seated within the last, or rearward, notch of the sector 60. The foot pedal 47 is then released so that the spring 42 throws the rod 35 forwardly and this, by means of mechanism previously described, shifts the collar 21 to disconnect it from the sleeve 18 and, at the same time, the lever 33 is shifted forwardly to cause the wheel 30 to move downwardly to release the driving connection between the wheel 15 and the cone, and, by the connection provided between the foot lever 44 and the sector 60, the latter is moved rearwardly so that the clutch surface of the wheel 15 will be pressed tightly within the clutch 10 and a direct driving connection with the shaft 12 is made.

Figure 4:
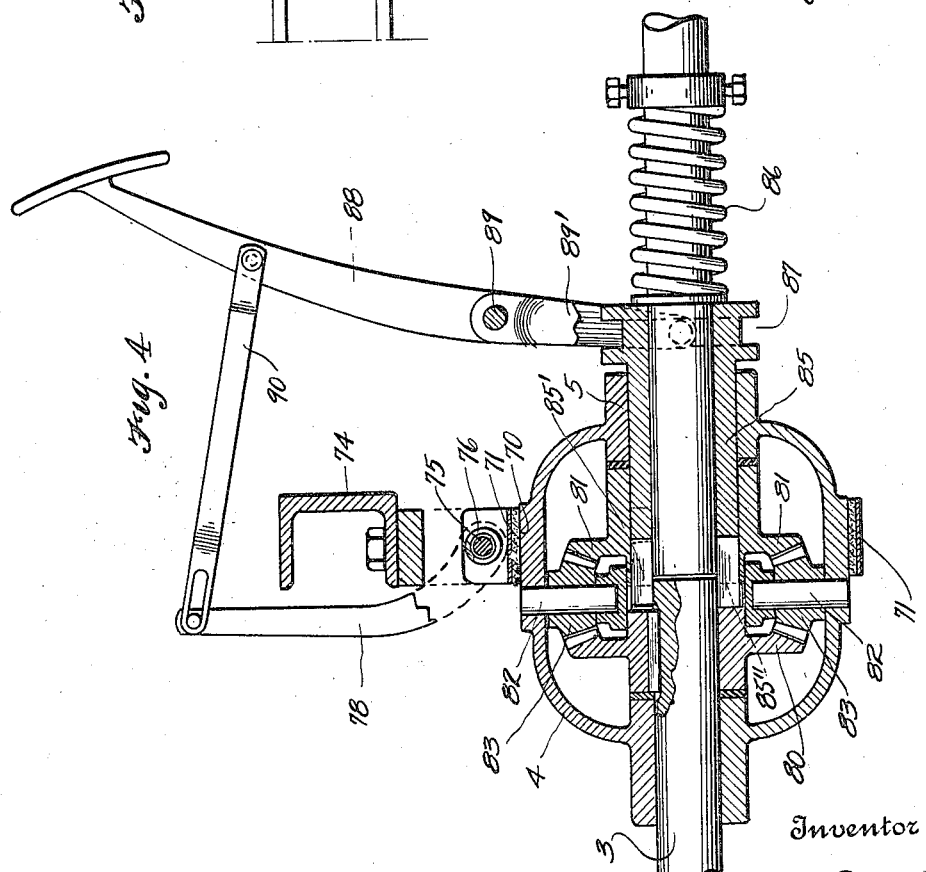
Figure 4 is a longitudinal, central section of the mechanism provided for reversing the direction of the driving shaft.

To provide for a reversal of the driving direction of the shaft 5, I have provided mechanism in connection with the gear housing 4 which is best shown in Figures 4 and 5. In this construction, the housing 4 is preferably made in two complemental sections that are bolted together about the adjacent ends of the alined shafts 3 and 5; the latter being adapted to rotate independently of each other within the housing. In transverse section, the housing 4 is circular and has a brake band surface 70 formed thereon about which is fitted a brake band 71. The ends of this band are fastened to shoes 72 and 73 and the shoe 73 is fixed to a cross beam 74 of the vehicle frame. A bolt 75 extends slidably through the shoes and a coiled spring 76 is mounted about the bolt, whereby the shoes are yieldingly urged apart. A nut 77 is threaded onto one end of the bolt and a lever 78 is fixed to the opposite end thereof, and this lever has a cam surface 79 bearing against a co-operating surface on the shoe 73, whereby forward movement of the lever effects the tightening of the band about the housing to prevent it from rotating.

Keyed to the inner end of the shaft 3, is a bevel gear 80 and, keyed onto the adjacent end of the shaft 5, is a similar bevel gear 81. Pins 82 are mounted in the housing 4 to extend between the gears 80 and 81, and, mounted on these pins, are gears 83 which mesh with both the gears 80 and 81. A clutch sleeve 85 is slidable along the shaft 5 into the housing, and, at its inner end, has teeth 85' that are adapted to lockingly engage with similar teeth 85'' on the hub portion of the gear 80. The sleeve rotates with the gear 81 and is normally urged inwardly within the housing 4 by means of a spring 86 that is coiled about the shaft and bears against the outer end of the sleeve and against the bearing 6. At its outer end, this sleeve has an annular groove 87, and a shifting pedal 88 is mounted upon the transverse shaft 43 and, at its lower end, has a yoke 89' with arms extended on opposite sides of the sleeve and with pins at their ends extending into the groove 87 of the sleeve, whereby, upon forward movement of the foot pedal 88, the sleeve will be shifted outwardly so that its inner end will disconnect from the gear 80. The lever 78 is joined to the foot pedal 88 by means of a link 90; the link having fixed connection with the foot pedal 88 and a pin and slot connection with the lever 78 whereby forward movement of the foot pedal is permitted before the lever 78 is actuated. This is provided in order that the sleeve may be disconnected from the gear 80 before the brake band will be tightened about the housing.

With this construction, the sleeve is normally retained locked to the gear 80, and the brake band is loosened which permits the housing 4 to revolve freely. This provides a direct driving connection between the shafts 3 and 5, since the gear 80 is keyed to the shaft 3 and the sleeve locked with gear 81 which is keyed to the shaft 5.

If it is desired to reverse the direction of the shaft 5, the foot pedal 88 is shifted forwardly. This withdraws the sleeve from the gear 80 and, at the same time, tightens the brake band about the housing so that the latter may not revolve. Driving is then effected through the shaft 3, gear 80 and the idler gears 83, which causes the gear 81 to rotate oppositely to the shaft 3.

It is apparent that with the device so constructed, any desired speed between maximum and minimum may be obtained by shifting the friction driving wheel 15 inwardly or outwardly within the bell.

It is also apparent that a direct driving connection between the shafts 5 and 12 may be obtained by shifting the wheel 15 into driving connection with the clutch 10 and that, at the same time, the frictional driving mechanism will be inoperative.

In Figure 6, I have illustrated an alternative construction for a variable and direct driving connection, to be used in case the shaft sections 5 and 12 are in alinement.

In this construction, a clutch head 10 is fixed at the forward end of a sleeve 10' that is slidable over the adjacent ends of these two shaft sections; the sleeve 10' being keyed to the shaft section 12. Rotatable on the sleeve 10' is a collar 18' which is adapted to be locked to the sleeve 10' by means of a clutch collar 21 which engages with the end thereof similarly as described in the preferred construction. The apex end of the bell 16 is connected with the sleeve 18' by means of a universal connection as shown at 11'. Also, mounted on the shaft section 5, is a clutch 95 which is adapted to be moved into and from driving connection with the clutch head 10 by means of a connecting key 96 which is fixed at one end to the clutch 95, and at its opposite end to a shifting collar 97 located on the shaft 5 forwardly of the driving wheel 15. It is intended that this collar 97 be connected, by suitable mechanism, with the foot pedal 44 in such manner that, when the latter is released, driving connection between the wheel 15 and the bell 16 will be discontinued and movement rearward of the foot pedal, due to the pressure of the spring 42, will shift the collar 97 rearwardly, and, due to the connecting key 96 that is slidable within the shaft 5, the clutch 95 will be engaged with the head 10 to effect a direct driving connection for the vehicle. In this arrangement, the parts operate automatically in such manner that, when the variable driving mechanism is released by the foot pedal, the direct connection immediately goes into effect.

In Figure 7, I have shown another alternative construction, wherein the driving member 15 is mounted, by means of a universal connection indicated at 98, upon a shifting sleeve 99 which would be connected similarly, as before described, to the shifting lever 50.

It is apparent that various changes in the details of construction in both devices could be made without departing from the spirit of the invention and, for this reason, it is not desired that the device be limited only to the details of construction herein illustrated.

Having thus described my invention, what I claim as new therein and desire to secure by Letters-Patent, is:

1. A transmission mechanism comprising in combination, a driving shaft, a driven shaft, a conically shaped, rotatably mounted bell, means for effecting a driving connection between the bell and the driven shaft, a friction wheel keyed for longitudinal shifting on the driving shaft and adapted for frictional driving contact with the interior of the said bell, means for shifting the friction wheel to obtain different driving speeds, means for effecting a direct driving connection between the driving and driven shafts and means operating automatically to release the driving connection between the bell and driven shaft when such direct driving connection is made.

2. A transmission mechanism comprising, in combination, a driving shaft, a driven shaft, a clutch head fixed to the driven shaft, a sleeve on said shaft, a conically shaped bell fixed to the sleeve, a shiftable clutch keyed to the driven shaft to be moved into and from driving connection with the sleeve, a friction wheel keyed on the driving shaft and normally in frictional driving contact with the inner surface of said bell whereby the latter may be revolved, means for shifting the wheel on the driving shaft and into driving contact with the clutch head to effect direct connection with the driven shaft, and means for disengaging the sleeve clutch when such direct connection is made.

3. A transmission mechanism comprising, in combination, a driving shaft, a driven shaft, a clutch head fixed to the driven shaft, a sleeve revoluble on the driven shaft, a conically shaped bell fixed to the sleeve, a clutch slidably keyed to the driven shaft, a shifting lever for the clutch, a friction wheel slidably keyed to the driving shaft and having frictional driving contact with the interior of the bell, means for shifting the friction wheel toward and from the apex of the bell and into driving contact with the clutch head to effect direct driving connection with the driven shaft, a control pedal, a rod connecting said pedal with the clutch shifting lever, a tightening wheel for holding the bell against the friction wheel and a lever connecting the tightening wheel support and said rod whereby movement of the rod which releases the clutch from the sleeve moves the tightening wheel to release the connection between the friction wheel and bell.

4. A transmission mechanism comprising in combination, a driving shaft, a driven shaft, a clutch head fixed to the driven shaft, a sleeve revoluble on the driven shaft, a yieldable support for the driven shaft, a conical shaped bell fixed to the sleeve and extending coaxially with the driven shaft, a clutch slidably keyed on the driven shaft, a shifting lever for the clutch, a friction wheel slidably keyed on the driving shaft and adapted for frictional driving contact with the interior of the bell, a pivotally mounted lever operatively connected for shifting the friction wheel toward and from the apex of the bell and into driving contact with the clutch head to effect a direct driving conection between the driving and driven shafts, a control pedal, a rod connecting the said pedal and the clutch shifting lever, a pivotally mounted locking sector movable with the control pedal, a locking means on the friction wheel shifting lever engageable with the locking sector to retain the said wheel at different positions of adjustment, a tightening wheel for holding the bell and friction wheel in driving contact and a control lever for the tightening wheel connected with said rod whereby movement of the rod which releases the clutch from the sleeve releases the frictional driving connection between the bell and friction wheel.

Signed at Seattle, Washington, this 23rd day of October, 1922.

JOHN OCKFEN.